Oct. 30, 1951 K. A. HARMON 2,573,196
BRAKE-HOLDER CONTROL MECHANISM
Filed April 21, 1950

INVENTOR
KENNETH A. HARMON

BY Chapin & Neal
ATTORNEYS

Patented Oct. 30, 1951

2,573,196

UNITED STATES PATENT OFFICE 2,573,196

BRAKE-HOLDER CONTROL MECHANISM

Kenneth A. Harmon, Longmeadow, Mass., assignor to Wico Electric Company, West Springfield, Mass., a corporation of Massachusetts Application April 21, 1950, Serial No. 157,239

13 Claims. (Cl. 192—3)

This invention relates to improvements in controls for the brake-holders of automotive vehicles. The invention finds one advantageous use in a vehicle of the type wherein the driving power is transmitted through a hydraulic clutch to the propeller shaft, serving to hold the brakes in applied condition, after they have been applied by the usual means, and preventing the creeping of the vehicle, which would otherwise occur, after the vehicle has been brought to a stop and the brake pedal has been released.

The invention is an improvement on that disclosed in an application of Glen A. Guernsey and Kenneth A. Harmon, for Brake-Holder Control Mechanism, Serial No. 145,692, filed February 23, 1950, and owned by the assignee of the present application.

According to the invention of the prior application, the brake-holder is rendered operative only when the rate of deceleration of the propeller shaft of the vehicle is within normal limits. The control involves a time switch, which will close in a predetermined and very short time interval after its action is initiated, and two switches, both actuated from the propeller shaft of the vehicle and responsive to the speed thereof, one for starting the action of the time switch at one predetermined speed, corresponding to a vehicle speed of say five miles per hour, and the other for stopping the action of the time switch at another and lower predetermined shaft speed, corresponding to a vehicle speed of say two miles per hour. If the decrease from the first to the second predetermined speed is effected in the predetermined time or in a longer time, then the time switch will be closed and the brake-holder will be rendered operative. If, however, such decrease is effected in less than the predetermined time, the time switch will not have time to close before its action is stopped by the second speed-responsive switch and the brake-holder will not be rendered operative. Each speed-responsive switch will be actuated for the purpose described not only at its stated predetermined speed but at all lower speeds including zero speed. Accordingly, when the automotive vehicle is started, both switches will be simultaneously actuated, one to start and the other to stop the action of the time switch, and it will not be possible for the time switch to operate and render the brake-holder operative until the vehicle has acquired enough speed to enable the switches to operate successively in the first described manner. Thus, the brake-holder is not immediately available after starting at the very low speeds.

This invention has for its object the provision of means, preferably automatic in action, for rendering the brake-holder effective immediately after starting the engine of the vehicle.

The invention also has for an object the control of such means from the switch of the starting motor of the vehicle, so that the lower of the speed-responsive switches will be prevented from moving to stopping position, when the circuit to the starting motor is closed, and held in such position during the interval, while such circuit is closed, in order to enable the time switch to act during said interval and render the brake-holder operative.

These and other objects will more particularly appear from the detail description of one illustrative example of the invention in connection with the accompanying drawings, in which.

Figure 1:
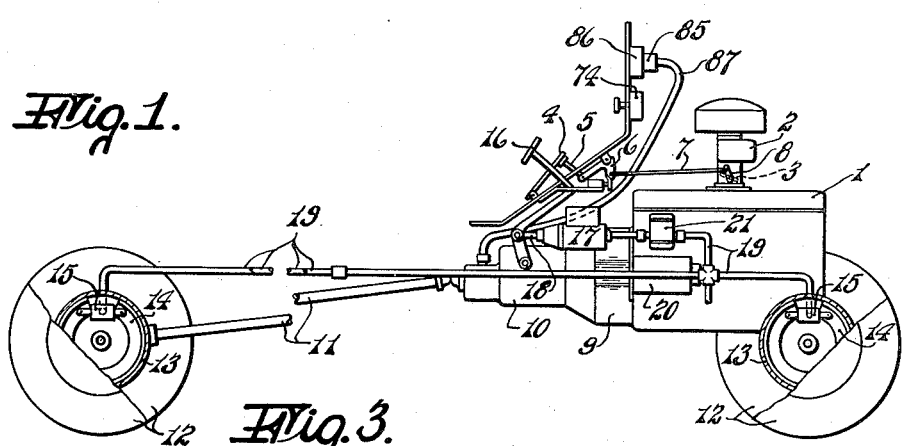
Fig. 1 is an elevational view of a wheeled, motor-driven vehicle embodying the invention, such parts of the vehicle as are unnecessary to an understanding of the invention being omitted.

In Fig. 1, there has been indicated in diagrammatical form those parts of a motor-driven wheeled vehicle that need to be considered for an understanding of the present invention. There are shown the motor 1, the carburetor 2, throttle valve 3, an accelerator pedal 4, operable when depressed to open the throttle valve 3 through suitable connections, such as rod 5, lever 6, rod 7, and lever 8; a hydraulic clutch 9, transmission 10, propeller shaft 11, wheels 12, the rear ones of which are driven from the shaft 11 in the usual way; brake drums 13 on wheels 12; brake shoes 14 in each drum, brake cylinders 15, one within each drum for actuating the brake shoes by hydraulic pressure; a brake pedal 16, master cylinder 17, having therein the usual piston (not shown), connected as by rod 18 to pedal 16 to be actuated by the latter, when depressed, and transmit pressure through a conduit 19 to the several brake cylinders 15 and cause the brakes to be applied. There is also shown the starting motor 20.

Figure 2:
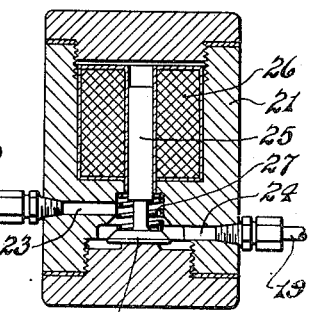
Fig. 2 is a sectional elevational view of an electromagnetically operated, brake-holding valve, suitable for use with the invention.

The brake-holder is indicated generally at 21 in Fig. 1. It includes a normally open valve of any suitable kind adapted to be interposed in the conduit 19 between the master cylinder 17 and the brake cylinders 15 and adapted, when closed, to prevent return flow of the pressure fluid which would otherwise occur, when brake pedal 16 is released, and thereby hold the brakes in applied condition. An illustrative example of one valve unit suitable for the purpose is shown in Fig. 2. The casing 21 has slidably mounted therein a valve 22 for controlling the communication between inlet and outlet passages 23 and 24, respectively connected on the master cylinder side and brake cylinder side in the conduit 19. The stem of valve 22 is in part a magnetic plunger 25 cooperating with a solenoid 26. A spring 27 tends to hold the valve in open position. The solenoid 26, when energized, will close valve 22 against the pressure of spring 27. Brake-holders of this type, for the purpose described, are old and well known. They may be used to control brakes on all of the wheels or those on only some of the wheels, as is also old and well known in the art.

Figure 3:
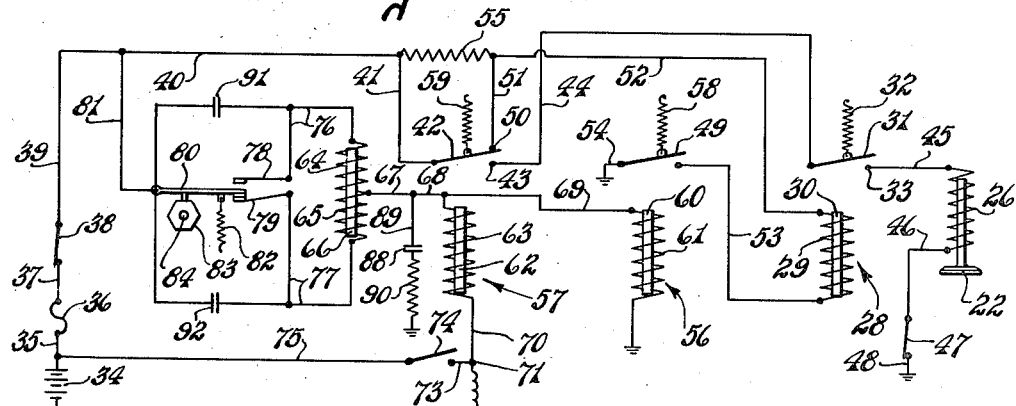
Fig. 3 is an electrical diagram showing a control system for the brake-holding mechanism.

The invention relates to the control of the brake-holder and, particularly, with the automatic application of it—not invariably but only when driving conditions make it safe or desirable so to do. The control functions to determine, when the brakes are applied, whether or not the propeller shaft of the vehicle is decelerating too rapidly. If it is, the brake-holder cannot be applied. If deceleration is not faster than a normal rate, the brake-holder will automatically be rendered effective, just before the wheels stop. This result can be accomplished in many ways. One example is shown in Fig. 3. It involves a time-delay means and a propeller-shaft-speed-responsive means so related that the decrease in speed of shaft 11, during application of the brakes by pedal 16, from one predetermined speed to another must occur after the time-delay means has become operative. The time-delay means, as herein shown, is a time-delay relay 28 having a coil 29, which when energized for some predetermined time interval, say for example a tenth of a second, will magnetize core 30 sufficiently to move switch 31 against the force of a spring 32 into engagement with its contact 33 and close an energizing circuit to solenoid 26. This circuit may be supplied from the usual six volt storage battery 34 of the motor vehicle. As shown, the energizing circuit for solenoid 26 is as follows, from the ungrounded terminal of battery 34, by wire 35, the usual fuse 36, wire 37, hand switch 38 which preferably is the usual ignition switch, wires 39, 40 and 41, a speed-responsive switch 42, contact 43, wire 44, switch 31, contact 33, wire 45, solenoid 26, wire 46, a switch 47, and a wire 48 to the ground and thus to the grounded terminal of the battery. Switch 47 is a release switch of any suitable kind, which can be opened at the will of the operator to release the brake-holder. Preferably, it is arranged to be opened and closed by depression and release, respectively, of the accelerator pedal 4. In this way, the brake-holder is de-energized whenever the accelerator pedal is depressed to increase the speed of the propeller shaft of the engine above idling speed.

The time delay relay is started in action, when, on deceleration of the vehicle, the propeller shaft decreases to a first predetermined value, say one corresponding to a vehicle speed of 5 miles per hour, and it is stopped, when the speed of such shaft decreases to a second and lower predetermined value, say one corresponding to a vehicle speed of 2 miles per hour. For this purpose, there are provided two switches which are responsive to the speed of propeller shaft 11 and function to start and stop the action of the time delay relay 28. The higher speed and starting switch is 49 and the lower-speed and stopping switch is the switch 42, above described. These switches and the hand switch 38 and coil 29 are arranged in series in an energizing circuit from battery 34. This circuit may be traced as follows, from the ungrounded side of battery 34, wire 35, fuse 36, wire 37, normally-closed hand switch 38, wires 39, 40 and 41, switch 42, contact 50, wires 51 and 52, coil 29, wire 53, switch 49 and wire 54 to the ground and thus to the other terminal of the battery. It will thus be seen that if the brakes are applied to stop the vehicle, the switch 49 will close at a propeller shaft speed corresponding to a vehicle speed of say 5 miles per hour and close the energizing circuit just described, thereby initiating the action of the time relay. Energization of coil 29 will continue until the stopping switch 42 is opened, which occurs at a propeller shaft speed corresponding to a vehicle speed of say 2 miles per hour. If the change from the first to the second propeller shaft speed is effected in the time which it takes for the time delay relay to close switch 49 or a longer time, the brake-holder circuit will be closed when switch 42 engages contact 43. If, however, the deceleration of the shaft is too rapid, then the switch 42 will be moved away from contact 50 and cause the breaking of the energizing circuit to the coil 29 of the time delay relay before the latter has time to close switch 31. Then, the engagement of switch 42 with contact 43 will not close the brake-holder circuit because of the open time switch 31.

Assuming that time switch 31 closes before speed-responsive switch 42 disengages from contact 50, then the switch 31 will be held closed by a holding circuit, which is the same as its energizing circuit through wire 40 and which then extends through a resistor 55, to wire 52 and thence through coil 29, wire 53, closed switch 49 and wire 54 to the ground. The resistor 55 has a value such as to limit the current flow through coil 29 and its magnetic pull to less than that required to close switch 31 but enough to hold this switch closed, after it has been closed as above described. Resistor 55 is initially shunted out by wire 41, closed switch 42 and wire 51.

With the brake-holder circuit closed as described, it will be broken, whenever the accelerator 4 is depressed by the opening of switch 47. The opening of the latter does not, however, affect the holding circuit of the time delay relay 28 and such circuit remains closed. Consequently, on release of the accelerator switch 47, the energizing circuit to the brake-holder solenoid 26 will again be reestablished and the brake-holder will be available. Opening of the hand switch 38 will, however, break the brake-holder circuit, the energizing and holding circuits for coil 29, and require recycling of the control.

The starting and stopping speed-responsive switches are parts of relays 56 and 57. The switches 49 and 42 are held open and closed by springs 58 and 59, respectively. They are movable to their other positions by the electromagnets controlled by switch means responsive to propeller shaft speed. The electromagnet for switch 49 comprises a core 60 and coil 61 thereon and that for switch 42 comprises a core 62 and coil 63 thereon. These coils 61 and 63 are arranged in circuits from battery 34 and controlled by suitable speed-responsive switch means, actuated from the propeller shaft. The arrangement is such that core 60 will be magnetized enough to pull in and close switch 49 on shaft speed at or below a first predetermined shaft speed, corresponding to a vehicle speed of say 5 miles per hour and core 62 will be magnetized enough to pull in and open switch 42 on shaft speeds at or below a second predetermined speed, corresponding to a vehicle speed of say 2 miles per hour. The release speeds for these relays 56 and 57 will naturally be somewhat higher than their respective pulling-in speeds, above described.

One desirable and advantageous propeller-shaft-speed-responsive means for controlling the relays 56 and 57 includes a choke coil, having two equal sections 64 and 65, mounted on a common magnetizable core 66. The junction of these sections is connected by wires 67 and 68 to one terminal of coil 63 and the latter terminal is connected by a wire 69 to one terminal of coil 61, the other terminal of which is grounded. The other terminal of coil 63 is also grounded but this is preferably effected by connecting such terminal, as by a wire 70 to the input terminal 71 of the starting motor 20, the other terminal 72 of the latter being grounded as usual. The input terminal 71 is connected by wire 73 to switch 74 and the latter by a wire 75 to the ungrounded terminal of battery 34. The choke coil, referred to, has its other terminals respectively connected by wires 76 and 77 to spring contact fingers 78 and 79. These fingers are alternately engaged by one end of a pivoted switch arm 80, the other end of which is connected by a wire 81 to wire 39 and thus to the ungrounded side of battery 34. The switch 80 is drawn by a spring 82 into engagement with a cam 83, which is driven by the propeller shaft 11 as for example by means of the described speedometer shaft 84. As shown, this cam has six lobes and thus the arm 80 will be oscillated six times during each revolution of shaft 84. This switch (Fig. 1) may be located in a casing 85 in back of the speedometer 86, which may be connected to the propeller shaft 11 in the usual manner by a flexible shaft, contained in a sheath 87. The shaft of a standard speedometer turns 1000 revolutions per mile. Hence, at vehicle speeds of 5 and 2 miles per hour, shaft 84 will turn at 83⅓ and 33⅓ revolutions, respectively. Thus, in the form shown, arm 80 will be oscillated 500 and 200 times per minute at propeller shaft speeds corresponding to 5 and 2 miles per hour, respectively. This switch arm 80 is arranged to move into engagement with and then, by continued movement, flex each spring contact finger. It is also arranged to engage one spring contact finger before it disengages from the other. Thus, the finger 79, which as illustrated has been previously flexed downwardly, will move upwardly, as switch arm 80 swings upwardly, until the latter engages finger 78. On continued upward movement, arm 80 will disengage from finger 79 and then flex finger 78 upwardly. The arrangement is such that one finger or the other is always connected to the arm 80. Thus, one section 64 or the other section 65 of the choke coil is always connected to the battery (when ignition switch 38 is closed) through a circuit which includes the relay coils 61 and 63 arranged in parallel. One such circuit is as follows, from the ungrounded terminal of battery 34, wire 35, fuse 36, wire 37, closed switch 38, wires 39 and 81, switch arm 80, finger 78, wire 76, choke coil section 64, wires 67, 68 and 69 and coils 63 and 61 to the ground. The other circuit is the same through switch arm 80 and then extends through finger 79, wire 77, choke coil section 65 (in a direction opposite to the previous flow through section 64) and thence by wires 67, 68 and 69 and the two coils 63 and 61 to the ground. It is to be noted that the starting motor 20 offers only very low resistance and this can be used as part of the ground connection of coil 63. The current flow through this coil is, of course, not enough to actuate the motor 20.

When the circuit is closed to one section of the choke coil, a current flow is established but, due to the inductance of the coil, there is a lag in building up the current and time is required for the current to reach its maximum value. As the speed of the cam increases, the time interval, during which a circuit to either section of the choke coil is closed, decreases and the maximum values to which the current can be built up decrease. A current flow is built up through one section of the choke coil in one direction and then through the other section in the other direction and a pulsating direct current wave is produced. This wave is smoothed out to some extent by the use of a condenser 88, one side of which is connected by wires 89 and 67 to the midpoint of the choke coil, and the other side of which is connected through a resistor 90 to the ground. The choke coil and the circuit breaker 78, 79 and 80 form a current-limiting means, functioning to limit the current flow through relay coils 61 and 63 proportionately to the speed of the propeller shaft of the vehicle, the current decreasing as the shaft speed increases. In this particular example, the coils 61 and 63 have substantially the same resistance and the same number of turns and the current flow through each is the same. While the magnetic pull of both relays is the same, the speed at which the two relays pull in to close their respective switches is made different by adjustment of the tension of springs 58 and 59 acting on the switch actuating armatures of the relays and/or by the adjustment of the air gaps between such armatures and their respective cores. The relay 56 will pull in when the propeller shaft 11 reaches the higher of the two predetermined speeds but the relay 57 will not pull in until a greater current flow has been produced to overcome the greater resistance to movement of its armature and this occurs only when the propeller shaft decreases to the lower of the two predetermined speeds.

It is desirable, in order to avoid arcing between the contacts on arm 80 and those on spring fingers 78 and 79, to bridge across each cooperating pair of such contacts a condenser, such as shown at 91 and 92.

In the diagram of Fig. 3, the coils 61, 63 and 29 have resistances of 12.68, 12.19 and 12.17 ohms, respectively; and choke coil sections 64 and 65 each have a resistance of 2.49 ohms; the resistors 55 and 90 are of 17.8 and 3 ohms resistance, respectively; the condenser 88 is of 1000 mfd. capacity; and the condensers 91 and 92 are of .1 mfd. capacity. These values are not critical but they will serve as illustrative examples of values found suitable for the purpose described. The relays are of standard form and can be procured from any relay manufacturer who will design them to function under the conditions stated.

In operation, assuming that the ignition switch 38 and release switch 47 are closed and that the operator has depressed the brake pedal to apply the brakes, as the propeller shaft 11 of the vehicle slows down to the first predetermined speed, relay 56 will pull in and close switch 49. This will close the energizing circuit to coil 29 and initiate the action of the time-delay relay 28. If the propeller shaft 11 decelerates at a sufficiently low rate, the coil 29, which has high inductance, will have time to build up sufficient flux in its core 30 to pull in and close switch 31. This may, for example, take one-tenth of a second. The closing of switch 49 prepares the energizing circuit for solenoid 26 so that it will be closed, when the low speed relay 57 pulls in and moves switch 42 from contact 50 to contact 43. The solenoid 26 will be energized to close valve 21 and the resistor 55 will be placed in circuit with coil 29, reducing the current flow therethrough to that necessary to hold switch 31 closed and thereby disabling the energizing circuit for coil 29 for its switch-closing function. If the propeller shaft decelerates faster than the predetermined rate, then the relay 57 will pull in before the time-delay relay 28 has had time to build up enough flux in core 30 to cause switch 31 to close. This causes the resistor 55 to be placed in series with coil 29 to limit the maximum current that can be built up in the coil to a value too low to be able to pull in the switch 31. Accordingly, the energizing circuit of the solenoid 26 remains open and the brake-holder will not be rendered operative.

The invention has the advantage that an accidental opening of the release switch 47 will not compel complete recycling of the control in order to render the brake-holder operative again. For example, if the operator accidentally depresses the accelerator pedal and opens switch 47, whereby the brake-holder is releaced, the latter can be re-applied by releasing the accelerator pedal before the vehicle acquires any substantial speed. The circuit to coil 29 will not be broken until the propeller shaft of the vehicle turns at a speed, corresponding to a vehicle speed of substantially more than 5 miles per hour. The release speeds of the relays 56 and 57 are, of course, greater than the pulling-in speeds. The dropping out of relay 57 will cause an increase in current through coil 29 and relay 28 remains energized to hold switch 31 closed. It is the dropping out of relay 56 which breaks the energizing circuit to coil 29 and releases the brake-holder. Thus, if the release switch 47, having been opened, is closed before the propeller shaft speed exceeds the release speed of relay 56, the energizing circuit to solenoid 26 can be re-established to apply the brake-holder.

The speeds, referred to herein, are illustrative examples. They may be varied through substantial limits, as desired by changing the characteristics of the relays, choke coil and breaker switch. Also the release speed of the relays may be reduced by reducing the current flow therethrough when the relay is pulled in in much the same way as the current flow was reduced through coil 29.

The described control, in effect, senses whether the propeller shaft of the vehicle is decelerating within or faster than normal rate limits and causes the brake-holder to be rendered operative or inoperative, respectively. When the brakes are applied and the propeller shaft speed decreases to one predetermined value, a time-delay means is set in action. Such means will cause the brake-holder to be rendered effective in a predetermined time. If on continued deceleration of the shaft, the second and lower predetermined speed is reached in less than said time, the brake-holder cannot be rendered operative. This feature prevents the brake-holder from locking the brakes in applied condition, when the wheels of the vehicles are on slippery surfaces and stop suddenly when the brakes are applied. The operator is left free to release his brakes if he deems it necessary. If it takes the same or more than said predetermined time for the propeller shaft to decrease from the high to the low predetermined speed, the brake-holder will be operative. Thus, the control decides whether or not it is safe for the brake-holder to be used and renders the same operative or inoperative accordingly.

It will be noted that opening of the ignition switch 38 will break all of the circuits described, causing all the parts to assume their illustrated positions. This normally occurs when the vehicle is stopped. A subsequent closing of switch 38 will simultaneously close the energizing circuits of both relays 56 and 57 so that they will simultaneously pull in and move their respective switches 49 and 42 to closed and open positions respectively. The result is that the coil 29 of the time delay relay cannot be energized Of course, after the vehicle reaches a speed equal to the release speed of relay 57, the latter will drop out and close the energizing circuit to the time delay relay. This, however, would mean that the brake-holder would not be available under the condition described at vehicle speeds lower than such release speed.

This invention overcomes the difficulty above described by the provision of means actuated by the closing of the starting motor switch 74 to cause the release of the low speed relay 57 by deenergizing its coil 63 and maintaining this coil deenergized during the period that the circuit to the starting motor 20 is closed. Thus, in starting the engine, the ignition switch is first closed, which as has been seen, will cause both relays 56 and 57 to pull in. Then, when the starting switch 74 is closed, the relay 57 will release and close the energizing circuit to, and initiate the action of, the time-delay relay 28. The action of the time-delay relay will be completed well within the time necessary to start the engine under the most favorable conditions and thus the brake-holder will be made available for use as soon as the car is started.

The result described may be effected in many different ways. As shown in Fig. 3, the wires 73 and 75 and the closed switch 74 of the starting motor circuit form part of a shunt for coil 63. These parts 73, 74 and 75 interconnect wires 35 and 70, which are connected indirectly or directly to the terminals of coil 63. The shunt is closed by the closure of starting switch 74 and remains closed as long as the starting switch is closed.

Figure 4:
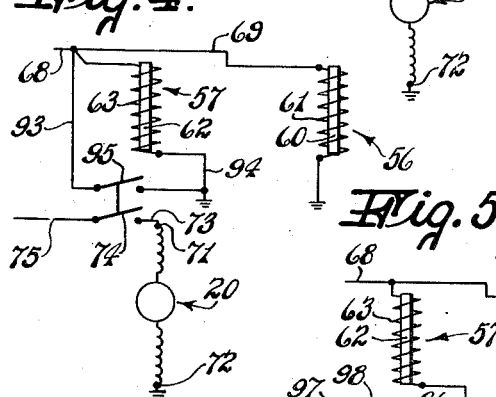
Figs. 4 and 5 are fragmentary diagrammatical views illustrating two modifications of the control system.

In Fig. 4, a shunt for coil 63 is provided that does not include any part of the starting motor circuit. This shunt comprises wires 93 and 94 and a control switch 95 which is connected to be opened and closed by the starting motor switch 74. In this modification, one terminal of coil 63 is grounded by grounding the wire 94 instead of using the starting motor 20 as part of the ground connection as was done in Fig. 3. The operation of the Fig. 4 shunt is the same as that of Fig. 3 in that current flow through coil 63 is stopped during the interval when the starting motor circuit is closed.

Figure 5:
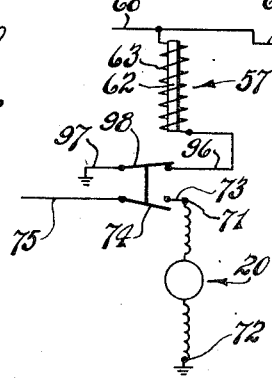

Instead of shunting out coil 63, its circuit may be opened during operation of the starting motor, as shown in Fig. 5. The coil 63 is grounded through wires 96 and 97 and a normally closed switch 98. Switch 98 is suitably connected to the starting motor switch 75 so as to open and close with the closing and opening of switch 75. Thus, the energizing circuit to coil 63 will be broken as soon as the starting motor circuit is closed and will remain open as long as the latter circuit is closed. Obviously, any of the switches controlling the deenergization of coil 63 can be actuated manually if desired, but the automatic operation is deemed preferable.

The invention thus provides an improvement in the brake-holder control of the general type herein disclosed, whereby the brake-holder is made available immediately following the actuation of the starting motor switch to start the engine of the vehicle.

What is claimed is:

1. In an automotive vehicle, having an engine-driven propeller shaft, braking apparatus, electrically-actuated means for holding the brakes in applied condition after they have been applied, a starting motor switch, and a storage battery; a first energizing circuit from said battery for said means; a normally-closed hand switch, a normally-open time switch, and a normally-closed release switch included in series in said circuit; electrical means operable when energized for a predetermined time to close the time switch, a second energizing circuit from said battery for said last-named means, a normally open starting switch and a normally-closed stopping switch included in series with said hand switch in said second circuit, means driven from said shaft for closing the starting switch at shaft speeds less than a first predetermined value and for opening the stopping switch at shaft speeds less than a second and lower predetermined value, whereby the closure of said time switch is contingent on a decrease in shaft speed from the first to the second predetermined value being effected in an interval equal to or greater than said predetermined time, the opening of said hand switch opening both said energizing circuits causing opening of the time switch and the starting switch and closing of the stopping switch, said hand switch if subsequently closed while said shaft is stopped simultaneously causing the starting switch to close and the stopping switch to open, thereby preventing closing of the second energizing circuit and actuation of the time switch, and means actuated by closure of said starting motor switch to close the stopping switch and maintain it closed while the starting switch is closed.

2. In an automotive vehicle, having an engine-driven propeller shaft, braking apparatus, electrically-actuated means for holding the brakes in applied condition after they have been applied, a starting motor switch, and a storage battery; a first energizing circuit from said battery for said means; a normally-closed hand switch, a normally-open time switch, and a normally-closed release switch included in series in said circuit; electrical means operable when energized for a predetermined time to close the time switch, a second energizing circuit from said battery for said last-named means, a normally-open starting switch and a normally-closed stopping switch included in series with said hand switch in said second circuit, means driven from said shaft for closing the starting switch at shaft speeds less than a first predetermined value and for opening the stopping switch at shaft speeds less than a second and lower predetermined value, whereby the closure of said time switch is contingent on a decrease in shaft speed from the first to the second predetermined value being effected in an interval equal to or greater than said predetermined time, the opening of said hand switch opening both said energizing circuits causing opening of the time switch and the starting switch and closing of the stopping switch, said hand switch if subsequently closed while said shaft is stopped simultaneously causing the starting switch to close and the stopping switch to open, thereby preventing closing of the second energizing circuit and actuation of the time switch, and a disabling means for closing the stopping switch when said hand switch is closed and the propeller shaft is stopped or moving at speeds less than said second predetermined value.

3. In an automotive vehicle, having an engine-driven propeller shaft, braking apparatus, electrically-actuated means for holding the brakes in applied condition after they have been applied, a starting motor switch, and a storage battery; a first energizing circuit from said battery for said means; a normally-closed hand switch, a normally-open time switch, and a normally-closed release switch included in series in said circuit; electrical means operable when energized for a predetermined time to close the time switch, a second energizing circuit from said battery for said last-named means, a normally-open starting switch and a normally-closed stopping switch included in series with said hand switch in said second circuit, a first electromagnet for closing the starting switch, a second electromagnet for opening the stopping switch, energizing circuits from said battery to the first and second electromagnets, switch means driven by the propeller shaft for controlling the circuits of both electromagnets energizing the first electromagnet to close its starting switch on shaft speeds at and below a first predetermined value and energizing the second electromagnet to open its stopping switch on shaft speeds at and below a second and lower predetermined value, whereby the closure of said time switch is contingent on a decrease in shaft speed from the first to the second predetermined value being effected in an interval equal to or greater than said predetermined time, the opening of said hand switch opening all said energizing circuits and causing opening of the time switch and the starting switch and closing of the stopping switch, said hand switch if subsequently closed while said shaft is stopped simultaneously causing the starting switch to close and the stopping switch to open thereby preventing closure of the second energizing circuit and actuation of the time switch, and means actuated by closure of said starting motor switch to deenergize the second electromagnet and close the stopping switch.

4. In an automotive vehicle, having an engine-driven propeller shaft, braking apparatus, electrically-actuated means for holding the brakes in applied condition after they have been applied, a starting motor switch, and a storage battery; a first energizing circuit from said battery for said means; a normally-closed hand switch, a normally-open time switch, and a normally-closed release switch included in series in said circuit, electrical means operable when energized for a predetermined time to close the time switch, a second energizing circuit from said battery for said last-named means, a normally-open starting switch and a normally-closed stopping switch included in series with said hand switch in said second circuit, a first electromagnet for closing the starting switch, a second electromagnet for opening the stopping switch, energizing circuits from said battery to the first and second electromagnets, switch means driven by the propeller shaft for controlling the circuits of both electromagnets energizing the first electromagnet to close its starting switch on shaft speeds at and below a first predetermined value and energizing the second electromagnet to open its stopping switch on shaft speeds at and below a second and lower predetermined value, whereby the closure of said time switch is contingent on a decrease in shaft speed from the first to the second predetermined value being effected in an interval equal to or greater than said predetermined time, the opening of said hand switch opening all said energizing circuits and causing opening of the time switch and the starting switch and closing of the stopping switch, said hand switch if subsequently closed while said shaft is stopped simultaneously causing the starting switch to close and the stopping switch to open thereby preventing closure of the second energizing circuit and actuation of the time switch, and a shunt for the second electromagnet closed and opened by the closing and opening respectively of the starting motor switch.

5. In an automotive vehicle, having an engine-driven propeller shaft, braking apparatus, electrically-actuated means for holding the brakes in applied condition after they have been applied, a starting motor switch, and a storage battery; a first energizing circuit from said battery for said means; a normally- closed hand switch, a normally-open time switch, and a normally-closed release switch included in series in said circuit; electrical means operable when energized for a predetermined time to close the time switch, a second energizing circuit from said battery for said last-named means, a normally-open starting switch and a normally-closed stopping switch included in series with said hand switch in said second circuit, a first electromagnet for closing the starting switch, a second electromagnet for opening the stopping switch, energizing circuits from said battery to the first and second electromagnets, switch means driven by the propeller shaft for controlling the circuits of both electromagnets energizing the first electromagnet to close its starting switch on shaft speeds at and below a first predetermined value and energizing the second electromagnet to open its stopping switch on shaft speeds at and below a second and lower predetermined value, whereby the closure of said time switch is contingent on a decrease in shaft speed from the first to the second predetermined value being effected in an interval equal to or greater than said predetermined time, the opening of said hand switch opening all said energizing circuits and causing opening of the time switch and the starting switch and closing of the stopping switch, said hand switch if subsequently closed while said shaft is stopped simultaneously causing the starting switch to close and the stopping switch to open thereby preventing a closure of the second energizing circuit and actuation of the time switch, and a switch in the circuit of the second electromagnet opened and closed by the closing and opening respectively of the starting motor switch.

6. Brake control mechanism for automotive vehicles, comprising, electrical means for holding the brakes in applied condition after they have been applied, an energizing circuit for said means; a plurality of switches in series in said circuit including a normally-closed hand switch, an accelerator switch adapted to be opened and closed when the accelerator of the vehicle is depressed and released respectively, and a normally-open time switch operable to close in a predetermined time after its action is initiated; electrical means for controlling the action of the time switch, an energizing circuit for said last-named electrical means, switches in the last-named circuit including said normally-closed hand switch, a starting switch adapted to be actuated from the propeller shaft of the vehicle and responsive to the speed thereof to open and close at respective speeds above or below a first predetermined low speed, and a stopping switch adapted to be actuated from said shaft and responsive to the speed thereof to close and open at shaft speeds above and below a second and lower predetermined speed, whereby on shaft speeds decreasing from above the first predetermined speed the starting switch will close the circuit to said second-named electrical means at the first predetermined speed and initiate the action of the time switch and the stopping switch will open such circuit at the second predetermined speed and stop said action and the circuit to said first electrical means will be closed only when the change from the first to the second predetermined speed occurs in said predetermined time or in a longer time, said hand switch when opened opening both energizing circuits and when subsequently closed causing the starting and stopping switches of the second-named energizing circuit to be simultaneously closed and opened respectively, whereby the time switch cannot close the circuit to the first electrical means, and a switch adapted to be actuated by starting of the starting motor and during operation of the latter to close said stopping switch.

7. Brake control mechanism for automotive vehicles, comprising, electrical means for holding the brakes in applied condition after they have been applied, an energizing circuit for said means; a plurality of switches in series in said circuit including a normally-closed hand switch, an accelerator switch adapted to be opened and closed when the accelerator of the vehicle is depressed and released respectively, a normally-open time switch operable to close in a predetermined time after its action is initiated; and a normally-open speed responsive switch; electrical means for controlling the action of the time switch, an energizing circuit for said last-named electrical means, switches in the last-named circuit including said normally-closed hand switch, a starting switch adapted to be actuated from the propeller shaft of the vehicle and responsive to the speed thereof to open and close at respective speeds above or below a first predetermined low speed, and a stopping switch, an electromagnet operable when sufficiently energized to open the stopping switch and close the first-named speed-responsive switch, control means for said electromagnet adapted to be actuated from said shaft and responsive to the speed thereof to energize said electromagnet at shaft speeds at or below a second and lower predetermined speed, whereby on shaft speeds decreasing from above the first predetermined speed the starting switch will close the circuit to said second-named electrical means at the first predetermined speed and initiate the action of the time switch and the stopping switch will open such circuit at the second predetermined speed and stop said action and the circuit to said first electrical means will be closed only when the change from the first to the second predetermined speed occurs in said predetermined time or in a longer time, said hand switch when opened opening both said circuits and when subsequently closed causing the starting and stopping switches of the second-named circuit to be simultaneously closed and opened respectively, whereby the time switch cannot close the circuit to the first electrical means, and a shunt circuit for said electromagnet adapted to be closed by the starting motor switch of the vehicle to deenergize said electromagnet and allow the stopping switch to close.

8. Brake control mechanism for automotive vehicles, comprising, electrical means for holding the brakes in applied condition after they have been applied, an energizing circuit for said means; a plurality of switches in series in said circuit including a normally-closed hand switch, an accelerator switch adapted to be opened and closed when the accelerator of the vehicle is depressed and released respectively, a normally-open time switch operable to close in a predetermined time after its action is initiated; and a normally-open speed responsive switch; electrical means for controlling the action of the time switch, an energizing circuit for said last-named electrical means, switches in the last-named circuit including said normally-closed hand switch, a starting switch adapted to be actuated from the propeller shaft of the vehicle and responsive to the speed thereof to open and close at respective speeds above or below a first predetermined low speed, and a stopping switch, an electromagnet operable when sufficiently energized to open the stopping switch and close the first-named speed-responsive switch, control means for said electromagnet adapted to be actuated from said shaft and responsive to the speed thereof to energize said electromagnet at shaft speeds at or below a second and lower predetermined speed, whereby on shaft speeds decreasing from above the first predetermined speed the starting switch will close the circuit to said second-named electrical means at the first predetermined speed and initiate the action of the time switch and the stopping switch will open such circuit at the second predetermined speed and stop said action and the circuit to said first electrical means will be closed only when the change from the first to the second predetermined speed occurs in said predetermined time or in a longer time, said hand switch when opened opening both said circuits and when subsequently closed causing the starting and stopping switches of the second-named circuit to be simultaneously closed and opened respectively, whereby the time switch cannot close the circuit to the first electrical means, and a normally-closed switch in the circuit of said electromagnet and actuated to open position by the closing of the starting motor switch.

9. Brake control mechanism for automotive vehicles, comprising, a brake-holder, electrical means for actuating the brake-holder, an energizing-circuit for said means; a plurality of switches in series in said circuit including, a hand switch normally closed when the vehicle is in operation, an accelerator switch adapted to be actuated by the accelerator of the vehicle and to be closed when the accelerator is released and open when the accelerator is actuated, a time switch normally open and closing in a predetermined time after its action is initiated; and a speed-responsive switch; a first electromagnet controlling the last-named switch, an energizing circuit for said electromagnet including said hand-switch, a switch in said energizing circuit adapted to be actuated by the propeller shaft of the vehicle and operable to energize such electromagnet sufficiently to close said speed-responsive switch only when the propeller shaft is moving at or below a first predetermined speed, a second speed-responsive switch opened by said electromagnet when the latter closes the first speed-responsive switch, a second electromagnet operable when energized for a predetermined time to close the time switch, a third and normally-open speed-responsive switch, a third electromagnet for controlling the third speed-responsive switch, an energizing circuit for the third electromagnet including said hand switch and said propeller shaft switch and operable only when the propeller shaft is moving at or below a second predetermined speed higher than the first predetermined speed to close said third speed-responsive switch, an energizing circuit for said second electromagnet including said hand switch and the second and third speed-responsive switches, whereby on decreasing propeller shaft speeds the third speed-responsive switch will close the last-named circuit at the second-named predetermined speed and the second speed-responsive switch will open such last-named circuit at the first-named predetermined speed and if the interval between the closing of the third speed-responsive switch and the opening of the second speed-responsive switch is equal to or greater than said predetermined time, said time switch will close to actuate the brake-holder, the latter being released by opening of the accelerator switch or by the hand switch when the vehicle is stopped, a subsequent closing of the hand switch closing the energizing circuits to the first and third electromagnets and simultaneously closing the third and opening the second speed-responsive switches, thereby preventing operation of the time switch at speeds under the first-named predetermined speed, and deenergizing means for the first electromagnet adapted to be actuated by the closing of the starting motor switch of the vehicle to effect deenergization of the first electromagnet and closing of the second speed-responsive switch during closure of the last-named switch.

10. Brake control mechanism for automotive vehicles, comprising a brake-holder, electrical means for actuating the brake-holder, an energizing-circuit for said means; a plurality of switches in series in said circuit including, a hand switch normally closed when the vehicle is in operation, an accelerator switch adapted to be actuated by the accelerator of the vehicle and to be closed when the accelerator is released and open when the accelerator is actuated, a time switch normally open and closing in a predetermined time after its action is initiated; and a speed-responsive switch, a first electromagnet controlling the last-named switch, an energizing circuit for said electromagnet including said hand-switch, a switch in said second-named energizing circuit adapted to be actuated by the propeller shaft of the vehicle and operable to energize such electromagnet sufficiently to close said speed-responsive switch only when the propeller shaft is moving at or below a first predetermined speed, a second speed-responsive switch opened by said electromagnet when the latter closes the first speed-responsive switch, a second electromagnet operable when energized for a predetermined time to close the time switch, a third and normally-open speed-responsive switch, a third electromagnet for controlling the third speed-responsive switch, an energizing circuit for the third electromagnet including said hand switch and said propeller shaft switch and operable only when the propeller shaft is moving at or below a second predetermined speed higher than the first predetermined speed to close said third speed-responsive switch, an energizing circuit for said second electromagnet including said hand switch and the second and third speed-responsive switches, whereby on decreasing propeller shaft speeds the third speed-responsive switch will close the last-named circuit at the second-named predetermined speed and open it at the first-named predetermined speed and if the interval between the closing of the second speed-responsive switch and the opening of the third speed-responsive switch is equal to or greater than said predetermined time, said time switch will close to actuate the brake-holder, the latter being released by opening of the accelerator switch or by the hand switch when the vehicle is stopped, a subsequent closing of the hand switch closing the energizing circuits to the first and third electromagnets and simultaneously closing the third and opening the second speed-responsive switches, thereby preventing operation of the time switch at speeds under the first-named predetermined speed, and a shunt circuit for the first electromagnet adapted to be opened and closed by the opening and closing of the starting motor switch of the vehicle.

11. Brake control mechanism for automotive vehicles, comprising, a brake-holder, electrical means for actuating the brake-holder, an energizing-circuit for said means; a plurality of switches in series in said circuit including, a hand switch normally closed when the vehicle is in operation, an accelerator switch adapted to be actuated by the accelerator of the vehicle and to be closed when the accelerator is released and open when the accelerator is actuated, a time switch normally open and closing in a predetermined time after its action is initiated; and a speed-responsive switch; a first electromagnet controlling the last-named switch, an energizing circuit for said electromagnet including said hand-switch, a switch in said last-named energizing circuit adapted to be actuated by the propeller shaft of the vehicle and operable to energize such electromagnet sufficiently to close said speed-responsive switch only when the propeller shaft is moving at or below a first predetermined speed, a second speed-responsive switch opened by said electromagnet when the latter closes the first speed-responsive switch, a second electromagnet operable when energized for a predetermined time to close the time switch, a third and normally-open speed-responsive switch, a third electromagnet for controlling the third speed-responsive switch, an energizing circuit for the third electromagnet including said hand switch and said propeller shaft switch and operable only when the propeller shaft is moving at or below a second predetermined speed higher than the first predetermined speed to close said third speed-responsive switch, an energizing circuit for said second electromagnet including said hand switch and the second and third speed-responsive switches, whereby on decreasing propeller shaft speeds the third speed-responsive switch will close the last-named circuit at the second-named predetermined speed and open it at the first-named predetermined speed and if the interval between the closing of the second speed-responsive switch and the opening of the third speed-responsive switch is equal to or greater than said predetermined time, said time switch will close to actuate the brake-holder, the latter being released by opening of the accelerator switch or by the hand switch when the vehicle is stopped, a subsequent closing of the hand switch closing the energizing circuits to the first and third electromagnets and simultaneously closing the first and third and opening the second speed-responsive switches, thereby preventing operation of the time switch at speeds under the first-named predetermined speed, and a normally-closed switch in the circuit of the first electromagnet adapted to be actuated to open position by the closing of the starting motor switch of the vehicle.

12. In an automotive vehicle, having an engine-driven propeller shaft, braking apparatus, electrically-actuated means for holding the brakes in applied condition after they have been applied, a storage battery, a starting motor, a switch for the motor, a circuit for the motor including said battery and switch, a hand switch, and an accelerator; a switch respectively closed and opened by release and depression of the accelerator, a time-delay relay including a normally-open switch and an electromagnet operable when energized for a predetermined time to close such switch, a second relay including first and second switches normally closed and open respectively and an electromagnet operable when energized to open and close such switches, an energizing circuit for the second-named electromagnet including said hand switch, a switch actuated by the propeller shaft and controlling the second-named circuit, said propeller shaft switch operable at propeller shaft speeds less than a first-predetermined value to energize the electromagnet of the second relay sufficiently to open the first and close the second switch of the second relay, a third relay including a normally open switch and an electromagnet, a circuit including the battery, ignition switch, propeller-shaft switch, and the electromagnet of the third relay for energizing such electromagnet sufficiently to close the switch of the third relay at propeller shaft speeds less than a second and higher predetermined value, an energizing circuit for the electromagnet of the time-delay relay including in series the battery, ignition switch, the first switch of the second relay, and the second switch of the third relay, whereby on decrease of speed of said shaft from values above the second predetermined value the third relay will close its switch at the second predetermined speed and start energization of the electromagnet of the time-delay relay and the electromagnet of the second relay will open its first switch at the first predetermined speed and stop the energization of the electromagnet of the time-delay relay, an energizing circuit for said electrically-actuated means including the battery, ignition switch, second switch of the second relay, the switch of the time-delay relay, and the accelerator switch, a portion of the starting motor circuit and the starting motor switch when closed forming a shunt for deenergizing the electromagnet of the second relay while the starting motor switch is closed.

13. In an automotive vehicle, having an engine-driven propeller shaft, braking apparatus for the wheels, electrically-actuated means for holding the brakes in applied condition after they have been applied, a starting motor for the engine, a storage battery, both motor and battery having one terminal grounded, a switch for the starting motor, conductors connecting the switch to the ungrounded terminals of the motor and battery, an ignition switch having one terminal connected to the ungrounded terminal of said battery, and an accelerator; a switch respectively closed and opened by release and depression of the accelerator, a time-delay relay including a normally-open switch and an electromagnet operable when energized for a predetermined time to close the switch, a second relay including first and second switches normally closed and open respectively and an electromagnet operable when energized sufficiently to reverse the positions of the first and second switches; a switch actuated by the propeller shaft, conductors connecting the switch to the other terminal of the ignition switch and to one terminal of the electromagnet of the second relay, a conductor connecting the other terminal of the last-named electromagnet to the ungrounded terminal of the starting motor, said propeller-shaft switch operable at propeller shaft speeds less than a first-predetermined value to energize the electromagnet of the second relay and open the first and close the second switch of the second relay, a third relay including a normally-open switch and an electromagnet operable when sufficiently energized to close it; a circuit including the battery, ignition switch, propeller-shaft switch, and the electromagnet of the third relay for energizing such electromagnet sufficiently to close the switch of the third relay at propeller-shaft speeds less than a second and higher predetermined value; an energizing circuit for the electromagnet of the time-delay relay including in series the battery, ignition switch, the first switch of the second relay, and the switch of the third relay; whereby on decrease of speed of said shaft from values above the second predetermined value the third relay will close its switch at the second predetermined speed and start energization of the electromagnet of the time-delay relay and the electromagnet of the second relay will open its first switch at the first predetermined speed and stop the energization of the electromagnet of the time-delay relay; and an energizing circuit for said electrically-actuated means including in series the battery, ignition switch, second switch of the second relay, the switch of the time-delay relay, and the accelerator switch; said starting motor switch when closed short-circuiting the electromagnet of the second relay to deenergize the same and allow said second switch to open.

KENNETH A. HARMON.

REFERENCES CITED

The following references are of record in the file of this patent:

UNITED STATES PATENTS

| Number | Name | Date |
| --- | --- | --- |
| 2,262,842 | Goepfrich | Nov. 18, 1941 |
| 2,272,320 | Freeman | Feb. 10, 1942 |
| 2,308,822 | Murphy | Jan. 19, 1943 |
| 2,313,430 | Goepfrich | Mar. 9, 1943 |
| 2,329,156 | Coffey | Sept. 7, 1943 |
| 2,334,611 | Darling | Nov. 16, 1943 |
| 2,414,409 | Goepfrich | Jan. 14, 1947 |